March 5, 1929.  H. JUNKERS  1,704,325
INTERNAL COMBUSTION ENGINE AND WORKING SAME
Filed March 6, 1924
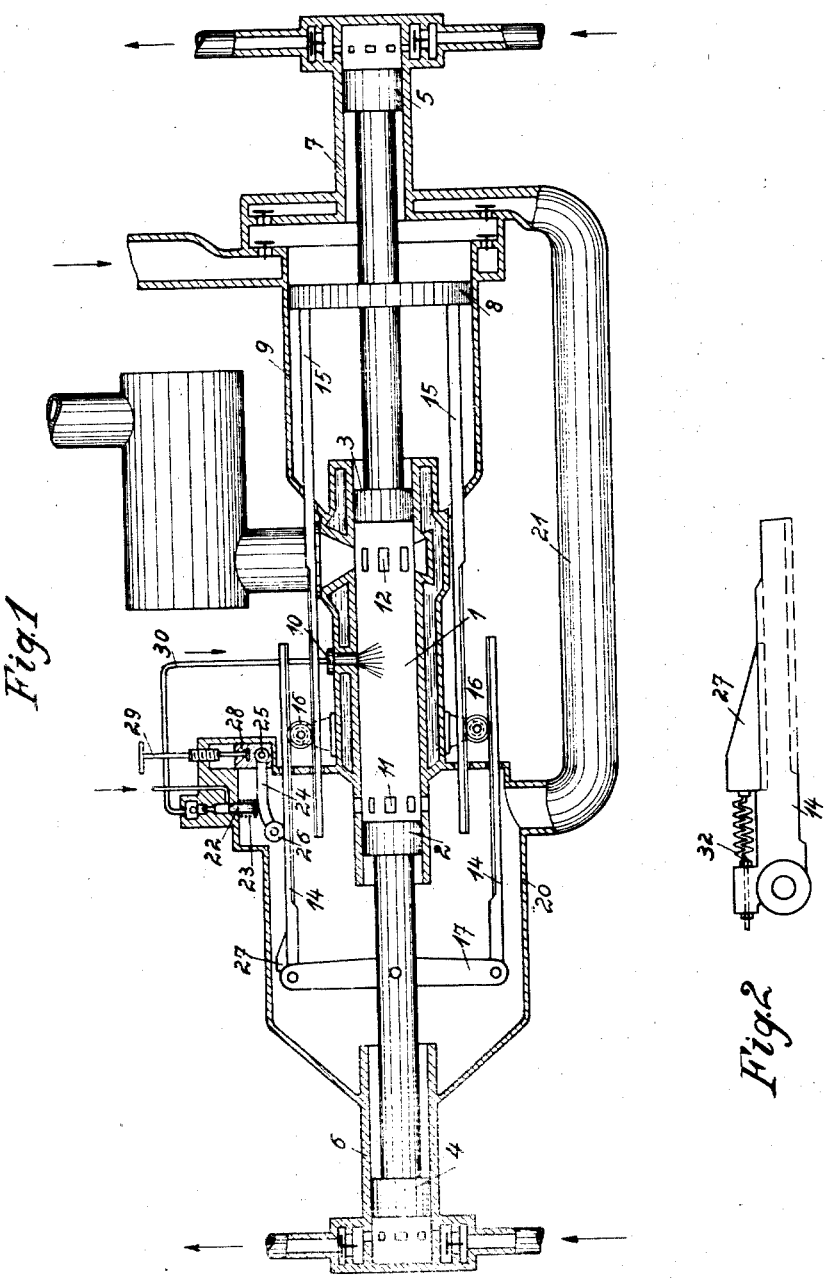
Inventor:
Hugo Junkers
by [signature]
Attorney Patented Mar. 5, 1929.

1,704,325

UNITED STATES PATENT OFFICE.

HUGO JUNKERS, OF DESSAU, GERMANY.

INTERNAL-COMBUSTION ENGINE AND WORKING SAME.

Application filed March 6, 1924, Serial No. 697,285, and in Germany March 12, 1923.

My invention refers to internal combustion engines and more especially to the kind of engines known under the name of engines with a free-flying piston, that is a piston which is not connected with the crank shaft by a connecting rod, so as to be returned by fly-wheel action or the like, but is counteracted for instance by a piston coupled with it and which is arranged for compressing air, the pressure thus created serving for returning the piston proper. My invention comprises a novel method of working such motors and the means for carrying this method into effect.

As is well known to those skilled in the art, the internal combustion motors in which the fuel is introduced near the end of the compression stroke into the cylinder charge which had before been highly compressed and heated, so that the fuel is inflammated in contact with this charge, have a high thermic efficiency. On the other hand, in consequence of the high temperatures and pressure, the cylinder walls of such motors are subjected to great wear and the gearing being utilized only imperfectly has an unfavorable mechanical efficiency, while the costs of keep up are very high.

According to my invention, the method above described, wherein the preferably liquid fuel is injected into highly compressed air, is carried out in an engine with free-flying piston of the kind mentioned at the beginning. According to my invention, the air charged into the cylinder is compressed until the ignition temperature is reached, the working piston being moved inwards by aid of an accumulator of energy which is charged during the working strokes of the motor. Apparently, in view of the fact that the working strokes of an engine of this type are not absolutely uniform, it had to be expected that the supply of fuel required for this method, and which must be regulated with great accuracy with reference to the path of the piston, would not be attainable. Experience has shown that, contrary to expectations, the working of an engine according to the present invention takes place with extraordinary perfection. Obviously, this is due to the fact that it is just the lack of a rigid limitation of the stroke which allows the piston motion to automatically adapt itself to the combustion of the fuel, in contradistinction to the rule hitherto observed that the combustion has to be adapted to the piston motion by regulating the supply of fuel.

My novel method can further be improved in such manner that a far higher relation of compression and expansion and, in consequence thereof, far higher combustion pressures can be obtained than is economically possible in crank engines. Owing to this possibility, the fuel can be utilized thermically to a far higher degree, inasmuch as now, owing to the fact that no crank gearing is present, a far-reaching expansion can be carried through without any considerable mechanical friction losses.

I have found it particularly useful to apply the new mtheod to an engine provided in a manner well known per se with two oppositely moving free-flying masses, for instance two oppositely moving pistons. Owing to the balance of masses, I thus obtain high piston speeds and an extraordinarily great proportion of strokes together with a diminution of the loss of heat by way of the injurious surface of the clearance, whereby the thermic efficiency is further improved. On the other hand, favorable conditions are also obtained during the compression as regards the keeping low of the heat losses. For the same reason the ignition temperature is reached with particular security so that also the starting of the engine and the use of heavy fuel is considerably facilitated.

I have further provided for keeping low the heat losses and the combustion of lubricant by providing means whereby the flying mass is quickly brought to the highest possible velocity. Means are further provided by which the return stroke is retardated in proportion to the working stroke, thereby leaving the cylinder time for the distribution of heat. Means are also provided which allow the use of any kind of fuel injection, and this also during and after the piston has passed through the inner dead centre position. An arrangement of the latter kind may consist in an energy accumulator which is charged by the working piston motion and is discharged at the end of the stroke in order to actuate the injecting device. The energy accumulator can be of a static kind (for instance a piston loaded with compressed air or a spring) or of a dynamic kind (a moving mass).

In the drawings affixed to this specification and forming part thereof an engine embodying my invention is illustrated diagrammatically by way of example, Fig. 1 being a longitudinal section, while Fig. 2 is an elevation showing a detail drawn to a larger scale.

Referring to the drawings, 1 is the working cylinder and 2 and 3 are two working pistons moving in opposite directions. Although I have shown an engine with two pistons moving in opposite directions, I wish it to be understood that my invention is by no means limited to this particular type of engine and can as well be embodied in an engine having only a single working piston. 4 and 5 are compressor pistons coupled with the pistons 2 and 3, respectively and 6 and 7 are the compressor cylinders acted upon by the pistons 4 and 5. With the working piston 3 there is furthermore coupled a scavenging pump piston 8 reciprocating in the scavenging pump cylinder 9. At one end of the working cylinder 1 there are arranged scavenging ports 11 governed by working piston 2, at the other end exhaust ports 12 governed by working piston 3. The scavenging ports 11 are surrounded by a large container 20 serving for collecting the scavenging air and into which scavenging air is supplied through pipe 21 from the pump 8, 9.

In order to secure an exact working of the flying masses in opposite directions, each mass is provided with a pair of racks 14 and 15, respectively, these racks being connected to one of the masses by a cross head 17, to the other by means of scavenging piston 8. The racks mesh in pairs with pinions 16 mounted on the engine bed, whereby the movements of the two flying masses are made positively dependent one upon the other.

The engine is supplied with liquid fuel by a fuel pump comprising a piston 22 acted upon by a spring 23 and resting on a rock lever 24 having one end mounted in a link 25 and carrying at the other end a roller 26. On one of the racks 14 there is mounted a cam 27 in such position that lever 24 is lifted together with the pump piston 22 as soon as the working pistons 2 and 3 have almost reached their inner dead centre position. The pump feeds fuel through pipe 30 to the injection nozzle 10, through which it is injected into the combustion chamber in finely atomized condition. The end 25 of lever 24 is not mounted immovably, but in a displaceable block 28, whose position can be adjusted by hand or by means of a regulation device acting upon a screw spindle 29. By this means the effective stroke of the pump can be varied together with the quantity of fuel injected, according to the output of the engine required in each individual case. The direct injection of fuel, which is governed exclusively by the pump, can also be replaced by injection with the aid of compressed air. In this latter case the cam 27, instead of acting on the pump, will have to act upon the injection nozzle.

The operation of this engine is as follows:—

In the outer dead centre position of the working pistons illustrated in the drawings the working cylinder 1 is already traversed by scavenging air so as to be filled with fresh air. In the dead spaces of the two compressors compressed air is still left, which now expands again, thereby pushing the two pistons 2, 3 back, whereby these latter close the ports 11 and 12 and thereafter compress the air enclosed between them beyond the ignition temperature of the fuel, utilizing therein the expansion of the air in the compressor cylinders. If compressors are used which work with an average of pressure in the suction pipe, such as so-called air circulating plants, the suction pipe pressure can also be made to return the pistons. As soon as the pistons 2 and 3 have come near their innermost dead centre position, the roller 26 will roll upwards on cam 27, thereby causing fuel to be injected which is ignited in contact with the highly compressed air in the cylinder, whereby the working stroke of the pistons is caused to take place. The supply of fuel still continues when the pistons 2, 3 already begin to move away from each other, as, in consequence of the elastic pressure lasting on the compressed fuel, the duration of the injection is longer than the feed motion of the pump. As at the beginning of the stroke the resistance in the compressor cylinders is still small, almost the total power stored in the gases of combustion is first converted into acceleration of masses, so that the pistons very quickly assume a high velocity, which is accompanied by a quick expansion and consequently also a quick reduction of pressure and temperature of the hot gases. In this outwards movement of the working pistons also cam 27 is withdrawn underneath roller 26, lever 24 is free to oscillate in downward direction and pump piston 22 executes its suction stroke so that fresh fuel is made available for the next succeeding working stroke of the motor. The counter pressure in the compressor cylinders acts towards retardating the movement of pistons 2 and 3 and near the end of its stroke, piston 3 uncovers the exhaust ports 12, and shortly thereafter piston 2 uncovers the scavenging ports 11. In the meantime, pump 8 has refilled the scavenging air container 20 and scavenging can be effected anew, and so on. In an engine of this kind the work of compression as well as the work of returning the piston can also be made to act towards one side or be done from one side; in such a case transmission of power must take place across the balancing gear.

Fig. 2 illustrates an arrangement of the cam cooperating with the fuel pump, whereby a generation of power for operating the injection device is rendered possible, even while the working pistons are at rest and are starting on their working strokes. To this end the cam body 27 is displaceably disposed on the rack 14 and is connected with this latter only by a spring 32. In view of the great retardation which the working piston and with it the rack 14 undergo upon reaching their inner dead centre position, the mass of the cam body 27 will retain its velocity and will therefore continue moving in the old direction, at the same time placing the spring 32 under tension, until this tension balances the mass power of the cam. As a rule, this will be the case only after the direction of moving of the piston and the rack connected therewith has been reverted. This arrangement therefore offers the possibility of operating the injection device (pump and injection valve) beyond the dead centre position of the working piston and to thus obtain a longer duration of the injection beyond the beginning of the expansion stroke.

I wish it to be understood that I do not desire to be limited to the exact details of construction shown and described, for obvious modifications will occur to a person skilled in the art.

I claim:—

1. The method of working free-flying-piston engines, comprising causing the charge of air in the working cylinder to be compressed at least so far that it assumes the ignition temperature of the fuel, and thereafter introducing in positively timed relation in the cycle the non-ignited fuel into the air thus compressed within the cylinder near the inner dead centre position of the piston so as to instantly burn each particle of fuel as it enters the cylinder.

2. The method of working free-flying-piston engines, comprising causing the charge of air in the working cylinder to be compressed far beyond the ignition temperature of the fuel, and thereafter introducing in positively timed relation in the cycle the non-ignited fuel into the air thus compressed within the cylinder near the inner dead centre position of the piston so as to instantly burn each particle of fuel as it enters the cylinder.

3. The method of working free-flying-piston engines, comprising causing the charge of air in the working cylinder to be compressed to at least 50 atm. and thereafter introducing in positively timed relation in the cycle the non-ignited fuel into the air thus compressed within the cylinder near the inner dead centre portion of the piston so as to instantly burn each particle of fuel as it enters the cylinder.

4. Internal combustion engine comprising in combination, a working cylinder, a free-flying piston arranged for reciprocation in said cylinder, means comprising an accumulator of energy operatively connected with said piston for compressing the air in said cylinder so as to heat it to the ignition temperature of the fuel, and means under positive control of said piston for injecting fuel into said air near the inner dead centre position of said piston.

5. Internal combustion engine comprising in combination, a working cylinder, a pair of free-flying pistons arranged in said cylinder for reciprocation in opposite directions, means comprising an accumulator of energy operatively connected with said pistons for compressing the air in said cylinder so as to heat it to the ignition temperature of the fuel and means under positive control of said piston for injecting fuel into said air near the inner dead centre position of said pistons.

6. Internal combustion engine comprising in combination, a working cylinder, a pair of free-flying pistons arranged in said cylinder for reciprocation in opposite directions, an exhaust port near one and a scavenging port near the other end of said cylinder and adapted to be governed each by one of said pistons, means comprising an accumulator of energy operatively connected with said pistons for compressing the air in said cylinder so as to heat it to the ignition temperature of the fuel and means under positive control of said piston for injecting fuel into said air near the inner dead centre position of said pistons.

7. Internal combustion engine comprising in combination, a working cylinder, a free-flying piston arranged for reciprocation in said cylinder, means comprising an accumulator of energy operatively connected with said piston for compressing the air in said cylinder so as to heat it to the ignition temperature of the fuel, means for injecting fuel into said air and means connected with a reciprocating part of the engine for actuating said fuel injecting means near the inner dead centre position of said piston.

8. Internal combustion engine comprising in combination, a working cylinder, a free-flying piston arranged for reciprocation in said cylinder, means comprising an accumulator of energy operatively connected with said piston for compressing the air in said cylinder so as to heat it to the ignition temperature of the fuel, means for injecting fuel into said air, means connected with a reciprocating part of the engine for actuating said fuel injecting means near the inner dead centre position of said piston and means for allowing an injection of fuel to take place when said working piston starts for its working stroke.

9. Internal combustion engine comprising in combination, a working cylinder, a free-flying piston arranged for reciprocation in said cylinder, means comprising an accumulator of energy operatively connected with said piston for compressing the air in said cylinder so as to heat it to the ignition temperature of the fuel, means for injecting fuel into said air and means connected with a reciprocating part of the engine for actuating said fuel injecting means near the inner dead center position of said piston, a separate energy accumulator operatively connected with said actuating means being arranged for and charged up during the return stroke of said working piston.

10. Internal combustion engine comprising in combination, a working cylinder, a free-flying piston arranged for reciprocation in said cylinder, means comprising an accumulator of energy operatively connected with said piston for compressing the air in said cylinder so as to heat it to the ignition temperature of the fuel, means for injecting fuel into said air and a mass resiliently connected with a reciprocating part of the engine for actuating said fuel injecting means near the inner dead centre position of said piston.

In testimony whereof I affix my signature.

HUGO JUNKERS.